Figure 1:
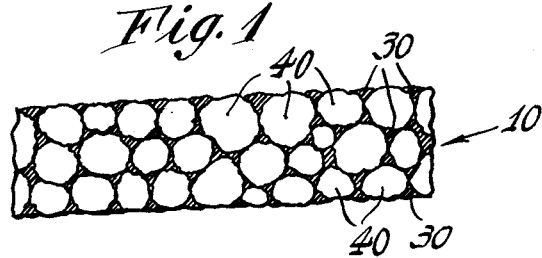

March 17, 1964 S. LEVINSON 3,125,618
METHOD OF MOLDING AND A CERAMIC BINDER FORMULATION
Filed Feb. 2, 1961

INVENTOR.
Solomon Levinson
BY
ATTORNEYS

United States Patent Office 3,125,618
Patented Mar. 17, 1964

3,125,618
METHOD OF MOLDING AND A CERAMIC BINDER FORMULATION
Solomon Levinson, Stamford, Conn., assignor to Vitramon Incorporated, Monroe, Conn., a corporation of Delaware
Filed Feb. 2, 1961, Ser. No. 86,743
6 Claims. (Cl. 264—63)

This invention relates to novel ceramic binder formulations, to the method of preparing the same, and to the method of casting or molding thin dielectric layers or slips from the same.

In the production of thin dielectric bodies, such as are utilized in the manufacture of capacitors, transducers, piezofilters and the like, from ceramic compositions such as those based on titanium dioxide, bismuth stannate, barium titanate, lead zirconate titanate, or other ferroelectric materials, it is known that the addition of resinous binders to the ceramic composition renders it cohesive and self-supporting in its "green" state or unfired state. These resinous binders are burned away during the high temperature firing of the dielectric body during which time a sintered body is produced.

An important difficulty encountered with the use of known resinous binder systems is that the evaporation of binder, toresin solvents, if present, and the burning away of binder, together with its modifiers such as plasticizers, dispersing agents, wetting agents, etc., leaves the dielectric body with numerous pinholes or micropores which have a detrimental effect upon the electrical characteristics thereof. For instance it has been found that degradation of the ceramic body at high temperatures in the order of 150° C. and under applied voltage of 100 volts per mil of thickness is quite severe and occurs rapidly when the ceramic body has pinholes and surface voids. These pinholes may be the result of improper deairing of the slip, causing tiny air bubbles to be introduced during casting, may be due to a decomposing constituent in the ceramic formulation, or may be related to the resin-solvent system as shown below. As the green ware is heated, solvents generally leave the body first. The resins are removed by combination of pyrolytic decomposition, volatilization, and oxidation. In some cases the resin may go through a polymerization initially and then the polymer will tend to decompose, oxidize, and volatilize.

All resinous binders which are used consist of a distribution of molecular weights. The sharpness of this distribution is determined either by the method of manufacture or by the specific characteristics of the resin when it is a natural material. This resin tends to settle in the spaces existing between the powder particles used in the ceramic formulation in the form of incompletely solubilized resin masses or gel particles. Under ideal conditions, one would desire that the resin leave the body uniformly. The presence of small amounts of gel material due to incomplete solution of the resin is undesirable because during burnout these gel particles burn away and will lead to small holes in the ceramic material which may or may not completely penetrate the thickness of the ceramic material. The depth of these holes is determined by the size of the gel particles. It has been found that a single solvent is less effective in eliminating these gel particles than a combination of solvents. Thus it has been found that a combination of particular type solvents leads to the elimination of holes or hole-like defects produced by incomplete solution of the resin. By the use of a combination of solvents it has been found that the resin is uniformly distributed around the ceramic particles and burns off in a very uniform manner. Another disadvantage of the resin binder systems which are used in forming ceramic bodies is the tendency for the slip cast ware to stick to the surface upon which it is cast. It is thus difficult to remove the film after it has been dried without altering the physical characteristics of the piece.

It is an object of the present invention to prepare a resinous binder system for ceramic compositions which may be evaporated and burned off gently and evenly during the preparation of such ceramics without resulting in the formation of pinholes or micropores inherent with binder systems heretofore known, and thus to produce ceramic bodies which are highly resistant to degradation at high temperatures and under applied voltage.

It is another object of the present invention to prepare a resinous binder system for ceramic compositions which has the added advantage of rendering the formed ceramic body self-releasing from the surface upon which it is cast. The use of a parting or release agent or layer on the casting surface is obviated.

These and other objects and advantages will be accomplished as more fully set out herein.

In the drawing:
FIGURE 1 represents a diagrammatic cross section, to an enlarged scale, of a sheet of ceramic composition 10, before firing, which contains a resinous binder applied by prior known methods and demonstrating the insoluble resin masses or gel particles 30 settled in the spaces between the ceramic powder particles 40.

Figure 2:

FIG. 2 represents the sheet of FIG. 1, after firing, showing the pinholes or micropores 31 resulting from the evacuation of the resin masses or gel particles 30.

Figure 3:
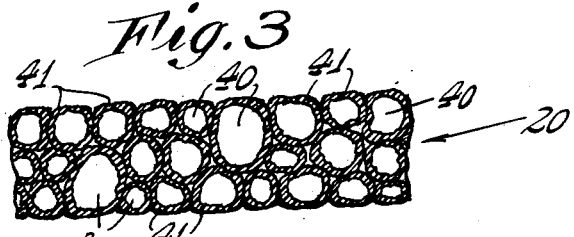

FIG. 3 represents a diagrammatic cross section, to an enlarged scale, of a sheet of ceramic composition 20 according to the present invention, before firing, containing a resinous binder applied as described herein and in the form of an even surface coating 41 surrounding each ceramic powder particle 40.

Figure 4:
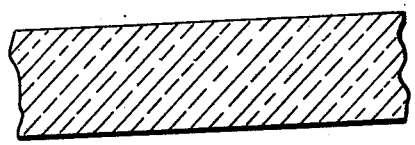

FIG. 4 represents the sheet of FIG. 3 after firing, and devoid of pinholes or surface voids.

According to the present invention, a binder system for ceramic composition is formulated by mixing a suitable binder resin which may be a homopolymer or copolymer of acrylic or methacrylic acids, esters or amides, a suitable plasticizing agent of low volatility which is substantially non-compatible with the particular resin used, and a mixture of three individual solvents comprising an ester of a glycol ether, an aliphatic ketone and an aromatic hydrocarbon. The binder system prepared as indicated is mixed with any suitable ceramic powder composition based upon, for instance, barium titanate or any of the other ferroelectric materials mentioned hereinbefore, so that the binder system constitutes from about 5 to 60% of the total mixture. The mixture is thoroughly blended and deaired so that the ceramic particles 40 are uniformly coated with a thin film 41 of the resin. The blended composition is next cast or similarly formed into thin slips or sheets as for instance by pouring the composition onto a glass plate or any other flat impervious surface conventionally used, heating at about 70° C. for a few minutes to evaporate the more volatile solvents, and subsequently stripping the cast film after removal from the oven. At this point the composition has the appearance demonstrated by FIG. 3 of the drawing and is known as the "green" or unfired ceramic. It has the flexibility of a plastic film and the consistency of clay and may be cut into any desired shape.

Next the "green" ceramic is removed with a blade from the belt or glass to which it is found to have negligible adhesion. It is then placed in an oven and fired in a conventional manner at a temperature from about 2000° to 2600° F. for a few minutes during which time the plasticizer, resinous binder and any residual solvents are evenly burned off and the ceramic powders sinter and fuse into a solid homogeneous dielectric sheet or body as shown in FIG. 4 of the drawing. The cooled mass is found to be strong, uniform, and free of pinholes or surface voids.

The reason for the absence of pinholes in the fired ceramic is not completely clear but it appears to be due to at least two important factors which are both related to the solvent mixture employed in the binder system. The use of a mixture of three or more volatile solvents of varying evaporation rates tends to prolong the evaporation rate of the solvent mixture and causes it to occur more evenly and less violently than is possible when using a single solvent or mixture of similar solvents. The solvents gradually leave as the temperature is raised so that the drying time of the body is not instantaneous. The amount which leaves at a given temperature naturally depends on the relative volatility of the solvents. Of equal importance is the fact that the solvent mixture employed has a relatively low drying temperature and a wide range of solvent power so as to provide excellent solvation of the entire range of resinous polymer chains present, whether they be of low, medium or high molecular weight. In this manner, a completely homogeneous solution of the resinous binder material may be formed so that upon mixing the same with the ceramic powder each powder particle is coated with a uniform layer 41 of resin, as illustrated by FIG. 3 of the drawing.

The plasticizer employed according to the present invention is one which is liquid between room temperature and the drying temperature of about 70° C. and substantially non-compatible with the resin binder. Triethylene glycol is an oily material which is preferred for this purpose when using polymethyl methacrylate as a binder. Other effective plasticizers include oily materials such as mineral oil, castor oil, dioctyl sebacate and silicone oil. This material exists in the "green" or unfired ceramic in the form of an oily film which is repelled by the resin-coated ceramic powders and which therefore provides an inherent parting or releasing agent which prevents the cast ceramic from adhering to the surface upon which it is cast. In place of the plasticizing agents named herein, other similar oleaginous materials may be employed with the limitation that they be substantially non-compatible with the resin used, and that their boiling point be in excess of the drying temperature of the cast body which is generally about 70° C.

The exact nature of the solvent mixture used is not critical although it is critical that at least one solvent from each of the three groups identified below be included in the mixture.

The first group of volatile solvents consists of the esters of glycol ethers including the Cellosolve esters such as Cellosolve acetate which is 2-ethoxy ethanol acetate, Carbitol acetate which is the ethyl ether of diethylene glycol acetate, and butyl Carbitol acetate which is the butyl ether of diethylene glycol acetate. These materials have relatively high boiling points.

The second group of volatile solvents consists of the aromatic hydrocarbons including materials such as toluene and xylene which are of medium volatility.

The third group of volatile solvents consists of the aliphatic ketones including materials such as diethyl ketone and methyl ethyl ketone which have relatively low boiling points.

It is also preferred to incorporate a wetting agent and/or a dispersing agent with the solution of the resinous binder to improve the spreading and coating properties thereof. Excellent results have been obtained through the use of Tergitol TMN wetting agent which is the trimethyl nonyl ether of ethylene glycol, and through the use of Duponol G (oil-soluble alcohol sulfate) dispersing agent.

The following examples are given by way of illustration and should not be construed as limitative.

EXAMPLE I

*Barium Titanate Ceramic Powder*

| Ingredient: | Mol percent |
|---|---|
| Barium titanate | 96.5 |
| Bismuth stannate | 3.5 |

450 parts by weight of the above barium titanate ceramic powder composition were mixed and deaired with the following resinous binder composition.

| Ingredient: | Parts by weight |
|---|---|
| Methyl methacrylate resin (B–44) | 30.0 |
| Triethylene glycol (plasticizer) | 6.0 |
| Butyl Carbitol acetate | 6.0 |
| Methyl ethyl ketone | 10.0 |
| Toluene | 90.0 |

*Example II*

450 parts by weight of a conventional barium titanate ceramic powder were mixed and deaired with the following resinous binder composition.

| Ingredient: | Parts by weight |
|---|---|
| Methyl methacrylate resin (B–44) | 56.0 |
| Triethylene glycol (plasticizer) | 30.0 |
| Butyl Carbitol acetate | 5.0 |
| Methyl ethyl ketone | 8.0 |
| Toluene | 80.0 |
| Xylene | 68.0 |
| Duponol G (dispersing agent) | 2.0 |
| Tergitol TMN (wetting agent) | 0.5 |

The ceramic-binder mixtures prepared according to the foregoing examples were poured onto a glass plate and heated to a temperature of about 70° C. to evaporate the solvents and form self-supporting sheets or slips having the consistency of clay. They were then cut into the desired shape and placed on zirconia setter plates into a furnace at a temperature of about 2500° F.

The formed ceramics were strong, free of any tendency to warp, free of pinholes and had excellent and uniform electrical characteristics.

As shown by Examples I and II supra, the resinous binder compositions of this invention comprise a major amount by weight of the volatile solvent mixture, the solvent mixture of Example I being equal to nearly 75% by weight of the total binder composition and the solvent mixture of Example II being equal to nearly 65% by weight of the total binder composition. As also shown by these examples, the volatile solvent mixture comprises a major amount by weight of the aromatic hydrocarbon. The solvent mixture also contains at least about 3% by weight of the ester of a glycol ether and at least about 5% by weight of the aliphatic ketone, as shown in Example II. In Example I the ester of the glycol ether comprises in excess of 5% by weight of the solvent mixture while the ketone comprises in excess of 9% by weight of the solvent mixture.

Variations and modifications may be made within the scope of the claims and portions of the improvements may be used without others.

I claim:

1. The method of forming a ceramic powder composition for the production of ceramic bodies which are substantially free of pinholes, which comprises mixing with a suitable ceramic powder a resinous binder composition consisting essentially of a synthetic resin selected from the group consisting of polymers and copolymers of acrylic and methacrylic acids, esters and amides, a plasticizer which is substantially incompatible with said resin and which is a liquid at temperatures below about 70° C., and a major amount by weight of a mixture of volatile organic solvents of different volatilities which provides for complete solvation of said synthetic resin and which may be gradually evaporated from said composition over an extended range of temperatures, said mixture comprising a major amount by weight of an aromatic hydrocarbon of medium volatility, at least about 3% by weight of an ester of a glycol ether which is substantially less volatile than said aromatic hydrocarbon, and at least about 5% by weight of an aliphatic ketone which is substantially more volatile than said aromatic hydrocarbon.

2. The method of forming a ceramic powder composition for the production of ceramic bodies which are substantially free of pinholes, which comprises mixing with a barium titanate ceramic powder a resinous binder composition consisting essentially of methyl methacrylate resin, triethylene glycol which is substantially incompatible with said resin, and a major amount by weight of a mixture of volatile organic solvents containing at least about 3% by weight of butyl Carbitol acetate, at least about 5% by weight of methyl ethyl ketone and a major amount by weight of toluene.

3. A ceramic powder composition for the production of ceramic bodies which are substantially free of pinholes, which comprises a suitable ceramic powder mixed with a resinous binder composition consisting essentially of a synthetic resin selected from the group consisting of polymers and copolymers of acrylic and methacrylic acids, esters and amides, a plasticizer which is substantially incompatible with said resin and which is a liquid at temperatures below about 70° C., and a major amount by weight of a mixture of volatile organic solvents of different volatilities which provides for complete solvation of said synthetic resin and which may be gradually evaporated from said composition over an extended range of temperatures, said mixture comprising a major amount by weight of an aromatic hydrocarbon of medium volatility, at least about 3% by weight of an ester of a glycol ether which is substantially less volatile than said aromatic hydrocarbon, and at least about 5% by weight of an aliphatic ketone which is substantially more volatile than said aromatic hydrocarbon.

4. A ceramic powder composition for the production of ceramic bodies which are substantially free of pinholes, which comprises a barium titanate ceramic powder mixed with a resinous binder composition consisting essentially of methyl methacrylate resin, triethylene glycol which is substantially incompatible with said resin, and a major amount by weight of a mixture of volatile organic solvents containing at least about 3% by weight of butyl Carbitol acetate, at least about 5% by weight of methyl ethyl ketone and a major amount by weight of toluene.

5. The method of forming ceramic bodies in sheet form which are substantially free of pinholes, which comprises mixing with a suitable ceramic powder a resinous binder composition consisting essentially of a synthetic resin selected from the group consisting of polymers and copolymers of acrylic and methacrylic acids, esters and amides, a plasticizer which is substantially incompatible with said resin and which is a liquid at temperatures below about 70° C., and a major amount by weight of a mixture of volatile organic solvents of different volatilities which provides for complete solvation of said synthetic resin and which may be gradually evaporated from said composition over an extended range of temperatures, said mixture comprising a major amount by weight of an aromatic hydrocarbon of medium volatility, at least about 3% by weight of an ester of a glycol ether which is substantially less volatile than said aromatic hydrocarbon, and at least about 5% by weight of an aliphatic ketone which is substantially more volatile than said aromatic hydrocarbon, casting said mixture upon a flat impervious surface and heating to evaporate said volatile solvents and form a self-supporting sheet, and firing said sheet to burn off said resin and form said ceramic body.

6. The method of forming ceramic bodies in sheet form which are substantially free of pinholes, which comprises mixing with a suitable ceramic powder a resinous binder composition consisting essentially of methyl methacrylate resin, triethylene glycol plasticizer which is substantially incompatible with said resin and a major amount by weight of a mixture of volatile organic solvents containing at least about 3% by weight of butyl Carbitol acetate, at least about 5% by weight of methyl ethyl ketone and a major amount by weight of toluene, casting said mixture upon a flat impervious surface and heating to evaporate said volatile solvents and form a self-supporting sheet, and firing said sheet to burn off said resin and form said ceramic body.

References Cited in the file of this patent

UNITED STATES PATENTS

| | | |
|---|---|---|
| 2,593,507 | Wainer | Apr. 22, 1952 |
| 2,694,245 | Rogers et al. | Nov. 16, 1954 |
| 2,966,719 | Park | Jan. 3, 1961 |

OTHER REFERENCES

Condensed Chemical Dictionary, 1950, published by Reinhold of New York City, pages 138 and 151.